United States Patent [19]

Dieu et al.

[11] Patent Number: 4,877,625

[45] Date of Patent: Oct. 31, 1989

[54] PROCESS FOR PRODUCING A SWEET CUSTARD FOODSTUFF WITH A LONG TERM SHELF LIFE BASED ON MILK AND EGGS

[75] Inventors: Bernard Dieu; Jean CuQ, both of Onet Le Chateau, France

[73] Assignee: Valmont S.A., Montauban, France

[21] Appl. No.: 144,261

[22] Filed: Jan. 15, 1988

[30] Foreign Application Priority Data

Jan. 5, 1987 [FR] France ................................ 87 00486

[51] Int. Cl.⁴ ......................... A23L 1/187; A23L 1/32
[52] U.S. Cl. ..................................... 426/250; 426/579; 426/580; 426/399; 426/658; 426/661
[58] Field of Search ............... 426/580, 521, 399, 614, 426/658, 661, 613, 587–588, 568, 250, 578–579

[56] References Cited

U.S. PATENT DOCUMENTS 3,166,424  1/1965  Stewart et al. .
3,579,631  5/1971  Stewart, Jr. et al. ............... 426/521

Primary Examiner—Marianne Cintins
Attorney, Agent, or Firm—Michael N. Meller

[57] ABSTRACT

A process for producing a sweet custard foodstuff is disclosed wherein milk is mixed with a concentrate of whole eggs obtained by ultrafiltration or by evaporation under low pressure and is subjected to sterilization by increasing the temperature to between 100°–160° C. for 1 to 10 seconds by direct steam injection so as to sterilize the product without subjecting the albumin to a prolonged cooking, followed by instant cooling through evaporation under partial vacuum, and aseptic homogenizing and filling.

2 Claims, 1 Drawing Sheet

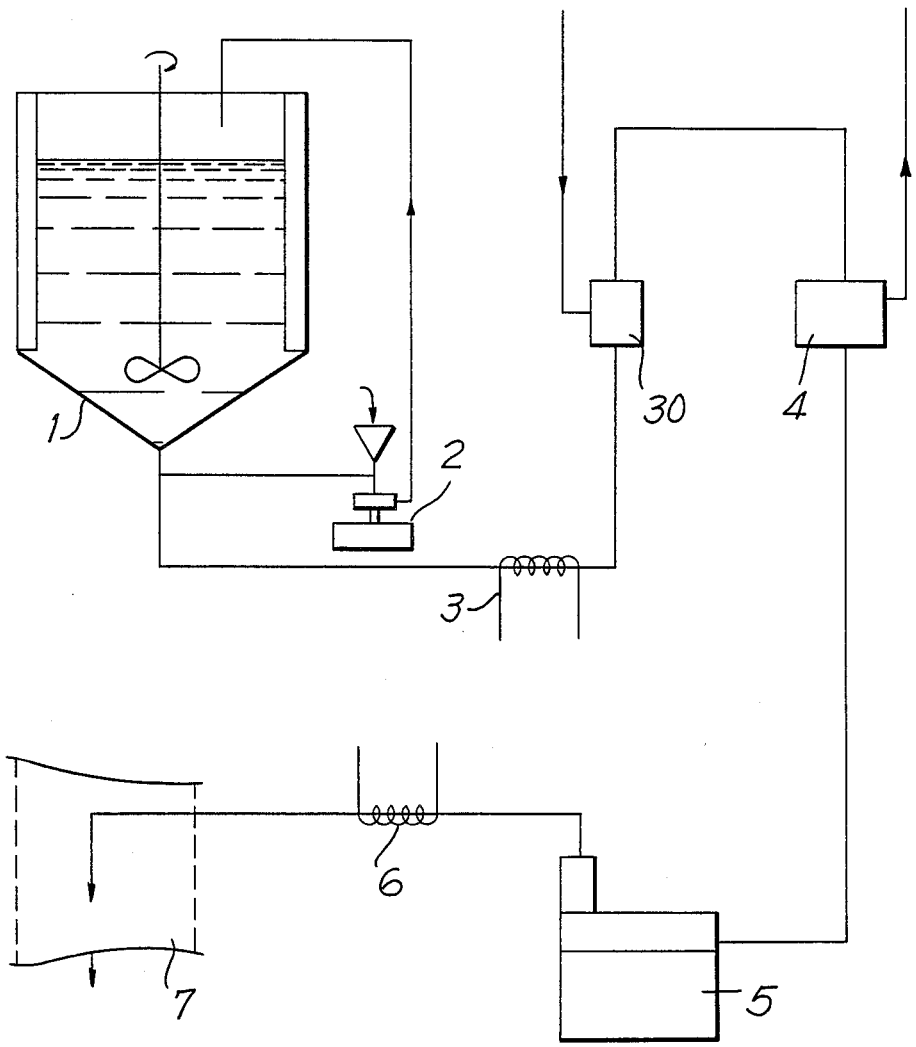

PROCESS FOR PRODUCING A SWEET CUSTARD FOODSTUFF WITH A LONG TERM SHELF LIFE BASED ON MILK AND EGGS

FIELD OF INVENTION

The object of the present invention is a process for producing a sweet foodstuff with a long term shelf stability. A sweet foodstuff called "custard" is known which is prepared by cooking egg yolk in milk complemented with additional ingredients such as sugar, colorant, flavor. This sweet foodstuff exhibits a shelf life which is only short and very close to the shelf life of milk, i. e. several days if kept cold and even less if kept at room temperature.

BACKGROUND ART

French Pat. No. 80 22 309 describes a process for producing a product based on an egg concentrate, which has very interesting bacteriological properties because the germ proportion therein is very low. Further, the yolk and the white are bound intimately to the extent that a product of a viscous consistency is obtained.

This egg concentrate is produced from whole eggs which are passed through a ultrafiltration device permitting a certain amount of water to be removed and, if required, through an evaporation device to remove an additional amount of water.

This egg concentrate is produced from whole eggs and is at present sold commercially.

It is, however, also possible to us eggs in a condition, other that concentrated eggs, e.g. fresh eggs, frozen eggs or egg powder. The organo leptic product quality of such products yet is considerably inferior.

OBJECT OF INVENTION

The object of the present invention is a process for producing a custard which has a shelf life of several months. This process uses an egg concentrate in combination with a particular type of sterilization permitting this product to be produced.

This sweet foodstuff can then be produced and marketed in large quantity, which was previously out of question.

BRIEF DESCRIPTION OF THE DRAWING

The invention will be better understood by reading the description of a particular embodiment made hereunder, taken in conjunction with one FIGURE which represents an associated device permitting the process to be carried into effect.

DETAILED DESCRIPTION OF INVENTION

The milk is introduced into the mixing tank 1 where it is stirred continuously. By milk, one should understand all milks, whatever their origin and whether they are reconstituted, skimmed, or have been subjected to a sterilization pretreatment. The milk is heated to a temperature comprised between 10° C. and 40° C. and, more particularly, to 30° C.

It is at this stage that at least one of the additional ingredients such as sugar, modified starch, stabilisers among which one can cite carrageenin and xanthane, as well as colorants, will be introduced, generally as powders. This introduction is carried out by means of a mixing apparatus 2 mounted on a branch conduit of the mixing tank. It is the same mixing apparatus that is used for introducing the egg concentrate into the mixing tank, since this egg concentrate has the appearance of a viscous paste.

The homogeneous composition thus obtained is then rapidly preheated at 3 to a temperature between 60°-90° C., preferably about 80° C., and thereafter sterilized at 30 by the direct injection of steam which rises instantly the product temperature to about 100° C. to 160° C. or preferably to 150° C. This product remains for about 1 to 10 seconds at temperatures in the range of 100° to 160° C. or for only several seconds at 150° C. and then is instantly brought back to a temperature between 60°-90° C., preferably about 80° C. at 4 through the evaporation of the water introduced as steam under partial vacuum, which water is thereby eliminated.

The product is sterilized by the temperature in this step, while avoiding any prolonged cooking of the egg albumin which could provoke a dissociation of the latter.

The following step is a homogenization step of the product at 5 after its sterilization, and more particularly after initial cooling under vacuum and before its final cooling at 6 to bring the temperature down from between 60°-90° to 15° to 30° C. by means of a heat exchanger.

The filling station 7 should be aseptic to ensure that the product retains entirely the quality of its sterility.

Once filled, the product can be stored at room temperature and requires no cold storage, the storage temperature being preferably maintained between 15° and 25° C. Thus, the quality of the product is not altered and its shelf life is extended to an average of six months.

The mixing of the milk at a temperature between 10°-40° C., eventually the rapid preheating to 60°-90° C. the short sterilization period and the rapid cooling thereafter, the parameters of all these steps are chosen in order to avoid precipitation of the egg components during the preparation of this foodstuff. The end temperature of the preheating step before sterilization is chosen such as to keep the amount of steam necessary for the sterilization at a level which does not incur a substatial dilution of the mixture.

The present invention is not limited to the exemplary embodiments described hereabove and on the contrary, is open to modifications and variations which will become apparent to those skilled in the art.

Thus, the sterilization temperature of 150° C. is given as a guide, but can be varied between 100° C. and 160° C.

We claim:

1. A process for producing a sweet custard foodstuff consisting of milk, eggs and at least one additional ingredient selected from the group consisting of sugar, modified starch, flavors, colorants and stabilizers comprising the steps of:
   mixing a mixture consisting of milk, eggs and at least one of said additional ingredients at a temperature between 10° and 40° C.,
   preheating said mixed milk mixture to a temperature between 60°-90° C.,
   sterilizing by increasing the temperature to between 100°-160° C. for 1 to 10 seconds by direct steam injection, thereby achieving sterility without prolonged cooking,
   cooling through evaporation under partial vacuum of water injected as steam to an intermediate temperature between 60°-90° C.,
   homogenizing under aseptic conditions at said intermediate temperature, and
   filling under aseptic conditions.

2. A process according to claim 1, wherein the eggs used for mixing with the milk are eggs concentrated by ultrafiltration or evaporation.

* * * * *